United States Patent
Esteghlal et al.

(10) Patent No.: US 7,347,193 B2
(45) Date of Patent: Mar. 25, 2008

(54) METHOD AND DEVICE FOR DETERMINING THE MASS FLOW RATE PASSING THROUGH THE AIR-BLEED VALVE OF AN INTERNAL COMBUSTION ENGINE TANK

(75) Inventors: Gholamabas Esteghlal, Stuttgart-Weilimdorf (DE); Dieter Lederer, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 120 days.

(21) Appl. No.: 10/564,460

(22) PCT Filed: Jul. 8, 2004

(86) PCT No.: PCT/DE2004/001466

§ 371 (c)(1),
(2), (4) Date: Jul. 12, 2006

(87) PCT Pub. No.: WO2005/008047

PCT Pub. Date: Jan. 27, 2005

(65) Prior Publication Data

US 2007/0163549 A1    Jul. 19, 2007

(30) Foreign Application Priority Data

Jul. 11, 2003    (DE) ............................... 103 31 581

(51) Int. Cl.
*F02M 37/04* (2006.01)
(52) U.S. Cl. ............ 123/520; 123/494; 73/118.2
(58) Field of Classification Search ........ 123/520, 123/519, 518, 516, 494; 73/118.2, 119 A, 73/195, 196
See application file for complete search history.

(56) References Cited

U.S. PATENT DOCUMENTS

| | | | | |
|---|---|---|---|---|
| 5,072,712 A | * | 12/1991 | Steinbrenner et al. | 123/677 |
| 5,373,822 A | * | 12/1994 | Thompson | 123/520 |
| 5,706,782 A | * | 1/1998 | Kurihara | 123/399 |

(Continued)

FOREIGN PATENT DOCUMENTS

DE    43 20 621    1/1995

(Continued)

*Primary Examiner*—Carl S. Miller
(74) *Attorney, Agent, or Firm*—Kenyon & Kenyon LLP

(57) ABSTRACT

A device for determining the mass flow via a tank venting valve for an internal combustion engine including an intake manifold and a throttle valve, the intake manifold being connected to the tank venting valve and an exhaust gas recirculation system, one measuring transducer each being assigned to the throttle valve and the tank venting valve, and a sensor for the mass flow via the exhaust gas recirculation system being assigned to the exhaust gas recirculation system. In order to be able to determine the mass flow via the tank venting valve with improved accuracy it is provided in such a device that a mass flow normalizer is assigned to the measuring transducers and to the sensor for the mass flow via the exhaust gas recirculation system; the mass flow normalizer picks up, sums, and normalizes the signals of the measuring transducers and the sensor assigned to the mass flows via the throttle valve, via the tank venting valve, and via the exhaust gas recirculation system; a convertor is assigned to the mass flow normalizer; the convertor calculates a virtual throttle valve angle from which an allocator determines the mass flow via the tank venting valve.

11 Claims, 2 Drawing Sheets

U.S. PATENT DOCUMENTS 6,116,210 A * 9/2000 Oder et al. .................. 123/305
6,622,691 B2 * 9/2003 Bagnasco et al. ............ 123/295
6,658,364 B2 * 12/2003 Olin ........................... 702/140

FOREIGN PATENT DOCUMENTS

| DE | 197 40 970 | 10/1998 |
| EP | 1 106 813 | 6/2001 |
| JP | 10-30469 | 1/1989 |
| JP | 11-44240 | 6/1989 |
| JP | 05 141 299 | 6/1993 |
| JP | 2000-38960 | 2/2000 |

* cited by examiner

METHOD AND DEVICE FOR DETERMINING THE MASS FLOW RATE PASSING THROUGH THE AIR-BLEED VALVE OF AN INTERNAL COMBUSTION ENGINE TANK

FIELD OF THE INVENTION

The present invention relates to a device for determining the mass flow via a tank venting valve for an internal combustion engine including an intake manifold and a throttle valve, the intake manifold being connected to the tank venting valve and an exhaust gas recirculation system, and one measuring transducer each being assigned to the throttle valve and the tank venting valve, and a sensor for the mass flow via the exhaust gas recirculation system being assigned to the exhaust gas recirculation system.

The present invention also relates to a method for determining the mass flow via a tank venting valve for an internal combustion engine including an intake manifold and a throttle valve situated therein.

BACKGROUND INFORMATION

Knowledge of current fuel tank venting systems is essential in order to ensure the determination of the mass flow via the tank venting valve in internal combustion engines having a variable valve train or in working points with a subcritical pressure condition involving significant exhaust gas recirculation. In a sophisticated engine controller, which aims at maintaining certain fuel/air ratios in the combustion chamber of the internal combustion engine with great accuracy, the fuel tank venting system may not be operated independently thereof, particularly since the fuel vapors are supplied to the internal combustion engine. The controller of the fuel tank venting system and the controller of the internal combustion engine are therefore closely connected. The controllable valves of the engine are controlled as a function of certain operating conditions of the internal combustion engine and different states of the fuel tank system or the fuel tank venting system.

The throttle valve position, the air flow, or the pressure may be measured in the intake system. In the engine itself, the engine speed may be the object of the detected signals. Its oxygen content is normally also detected in the exhaust gas of the internal combustion engine. The signals received by the controller unit are implemented in programs for controlling the system components, so that feeding of the fuel vapors into the intake system takes place without impairing the operation of the internal combustion engine. Moreover, a check of the system efficiency is possible in this way.

In the devices according to the related art the fact is utilized that the mass flow, which flows into the intake manifold via the tank venting valve, is calculated using the outflow characteristic curve as a function of the pressure differential at the tank venting valve. The outflow characteristic curve has a great ascent in the area of a subcritical pressure condition which results in inaccuracies and in the worst case in instability in the calculation of the mass flow. In previous engine controller designs, the mass flow via the tank venting valve is calculated as a function of the throttle valve angle and the engine speed in order to improve the accuracy. It is assumed here that the intake manifold pressure is proportional to the mass flow flowing in via the throttle valve. This assumption is not fulfilled in systems having a variable valve train or an exhaust gas recirculation.

SUMMARY OF THE INVENTION

The object of the present invention is to provide a device of the above-mentioned type which improves the accuracy of the calculation of the mass flow via the tank venting valve in engines having a variable valve train or in working points with subcritical pressure conditions involving significant exhaust gas recirculation and which thus effects an improvement in the driving and exhaust gas performance.

It is also the object of the present invention to provide a corresponding method.

The object regarding the device is achieved in that a mass flow normalizer is assigned to the measuring transducers and to the sensor for the mass flow via the exhaust gas recirculation system; the mass flow normalizer picks up, sums, and normalizes the signals of the measuring transducers and the sensor assigned to the mass flows via the throttle valve, via the tank venting valve, and via the exhaust gas recirculation system, and a convertor is assigned to the mass flow normalizer; the convertor calculates a virtual throttle valve angle from which an allocator determines the mass flow via the tank venting valve.

Normalization of the mass flow to its value at the standard conditions of 1013 mbar and 0° C. is accomplished in that the mass flow normalizer normalizes the signals provided by the measuring transducers and the sensor by taking the temperature, the factor density, and the flow-through factor into account.

According to a preferred invention variant, it may be provided that the allocator determines the mass flow via the tank venting valve from the virtual throttle valve angle by taking at least the engine speed, the temperature, the factor density, and/or the normalized supercritical mass flow via the tank venting valve into account.

An advantageous embodiment provides that an engine controller, which controls the engine parameters for the internal combustion engine, is situated downstream from the allocator.

A more accurate determination of the mass flow via the tank venting valve is achieved in that a measuring transducer is assigned to the pressure differential meter of the tank venting valve and the outflow characteristic curve of the tank venting valve is assigned to the measuring transducer.

A particularly compact assembly provides that the measuring transducers and/or the sensor and/or the mass flow normalizer and/or the convertor and/or the allocator are integral components of the engine controller or are combined in at least one additional subsystem.

The object of the present invention regarding the method is achieved in that the mass flows via the throttle valve, via the tank venting valve, and via the exhaust gas recirculation system are summed and normalized, by including normalization factors, in a mass flow normalizer for forming a normalized mass flow, in that a virtual throttle valve angle is determined from the normalized mass flow, and in that the mass flow via the tank venting valve is determined from the virtual throttle valve angle.

A particularly accurate determination of the mass flow is accomplished in that the normalized mass flow is normalized by including at least one flow-through factor, one temperature factor, and one factor density.

A possible embodiment provides that the assignment between the normalized mass flow and the throttle valve angle is predefined via a characteristic curve and that the virtual throttle valve angle is calculated from the value of the normalized mass flow.

Improved determination of the mass flow under different operating conditions is accomplished in that the mass flow via the tank venting valve is determined the virtual throttle valve angle, including the engine speed and/or taking into account the normalized supercritical mass flow via the tank venting valve and/or a factor density and/or a temperature factor.

In a preferred embodiment of the method, the virtual throttle valve angle is calculated which corresponds to the throttle valve angle which would be necessary to supply the sum of the mass flows flowing into the intake manifold via the throttle valve alone, thereby achieving considerably improved engine control at simultaneously reduced emission exhaust.

DETAILED DESCRIPTION

Figure 1:
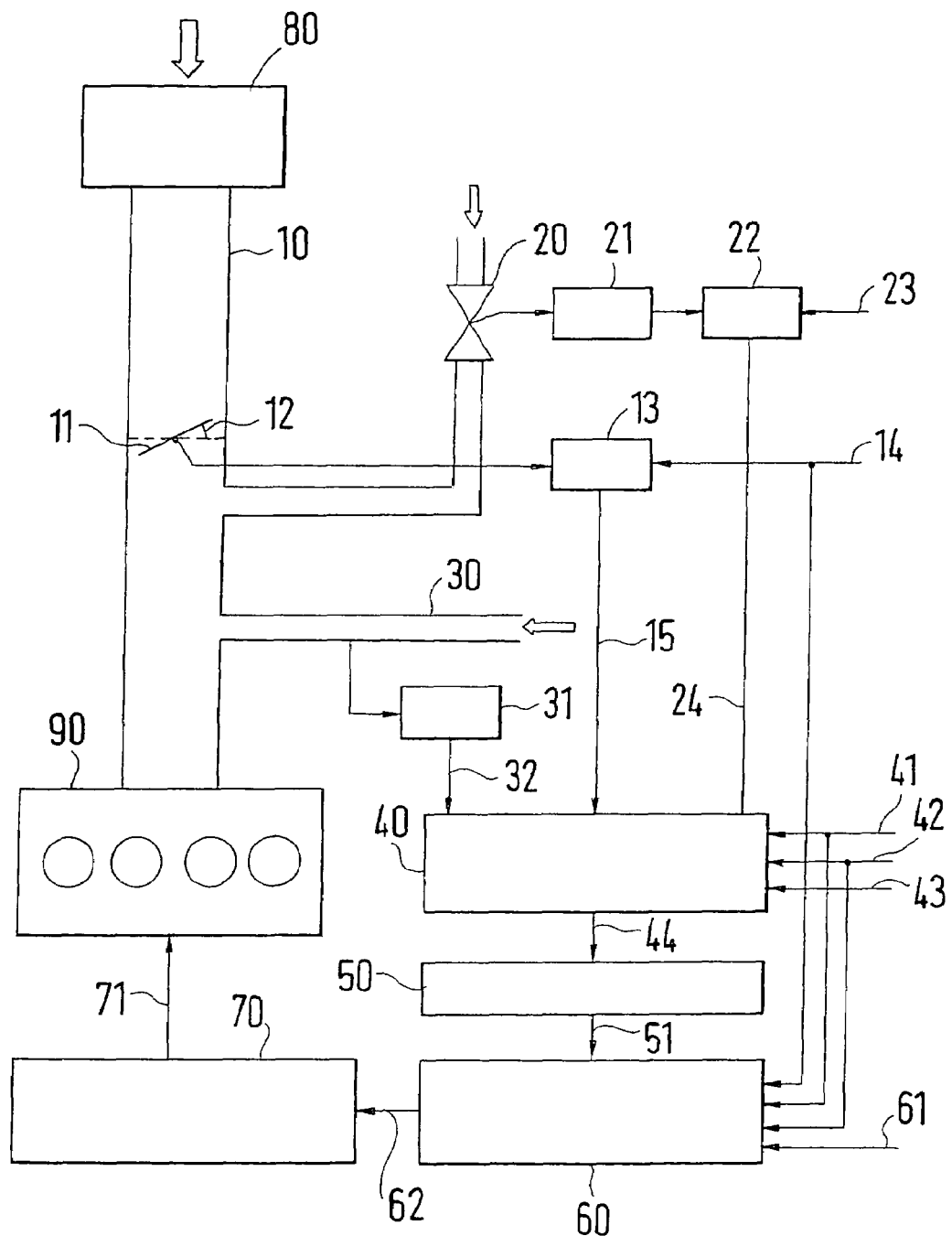
FIG. 1 shows a schematic representation of a device for determining the mass flow via the tank venting valve for an internal combustion engine.

FIG. 1 shows that the air intake for an internal combustion engine 90 is essentially made up of an intake manifold 10 which is situated between an air filter 80 and internal combustion engine 90. Intake manifold 10 is furthermore connected to tank venting valve 20 and exhaust gas recirculation system 30.

Situated in intake manifold 10 is a throttle valve 11 which is connected to a measuring transducer 13 for determining throttle valve angle 12, the measuring transducer being additionally connected to a signal line for engine speed 14. Measuring transducer 13 is also connected to a mass flow normalizer 40 for determining normalized mass flow 44.

Tank venting valve 20 is connected to a pressure differential meter 21 which in turn is connected to a measuring transducer 22 for determining mass flow 62 via tank venting valve 20. Outflow characteristic curve 23 of tank venting valve 20 is applied to measuring transducer 22, the outflow characteristic curve being stored in measuring transducer 22 or being predefined by another controller module, e.g., by engine controller 70. The output signal for mass flow 62 via tank venting valve 20 is also supplied to mass flow normalizer 40.

Furthermore, a sensor 31 is assigned to exhaust gas recirculation system 30, the sensor's output signal for mass flow 62 via exhaust gas recirculation system 30 also being supplied to mass flow normalizer 40.

Mass flow normalizer 40 is also connected to sensing elements and/or electronic and/or mechanical memory units for temperature factor 41, factor density 42, and flow-through factor 43 and calculates, as the output signal, mass flow 44, summed and normalized from the individual mass flows, which is supplied to a convertor 50. The output signal of this convertor 50 corresponds to virtual throttle valve angle 51 which together with the signals for temperature factor 41, factor density 42, normalized supercritical mass flow 61 via tank venting valve 20, and engine speed 14 is supplied to an allocator 60. A normalized mass flow 44 via tank venting valve 20 is initially determined there from a characteristic curve (KFAFTE). Mass flow 62 via tank venting valve 20 may subsequently be calculated as the output signal taking into account the above-mentioned factors. This output signal is connected to an engine controller 70 for further analysis. Engine controller 70 is operatively linked to internal combustion engine 90 via at least one control signal 71 and optimizes the efficiency, the fuel consumption, and the emission exhaust of internal combustion engine 90.

Figure 2:
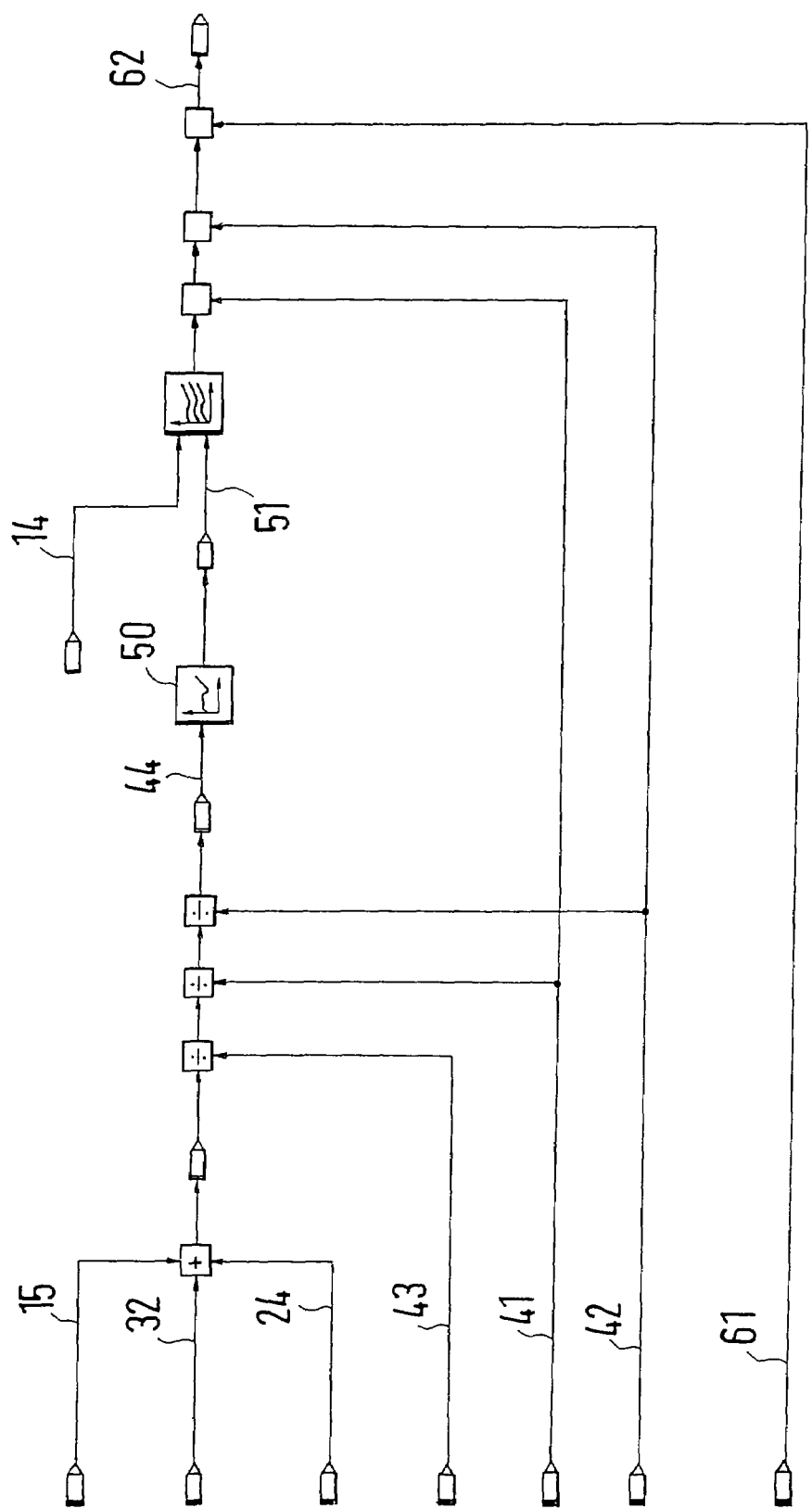
FIG. 2 shows a calculating method for determining the mass flow in a schematic representation.

FIG. 2 shows a possible embodiment of the calculation method according to the present invention. Mass flows 62 via throttle valve 11, via tank venting valve 20, and via exhaust gas recirculation system 30 are initially added and normalized using temperature factor 41, factor density 42, and flow-through factor 43. Normalized mass flow 44 is subsequently converted in convertor 50 into a virtual throttle valve angle 51. Virtual throttle valve angle 51 thus corresponds to throttle valve angle 12 which would be necessary to supply the sum of mass flows 62 flowing into intake manifold 10 via throttle valve 11 alone. In connection with engine speed 14 and taking into account temperature factor 41, factor density 42, and normalized supercritical mass flow 61 via tank venting valve 20, mass flow 62 via tank venting valve 20 is calculated which may be utilized in connection with an engine controller 70 shown in FIG. 1 for accurately controlling an internal combustion engine 90.

In a further embodiment, individual components from FIG. 1 may be integral components of engine controller 70 or may be combined in at least one subsystem.

What is claimed is:

1. A device for determining a mass flow via a tank venting valve for an internal combustion engine including an intake manifold and a throttle valve, the intake manifold being connected to the tank venting valve and an exhaust gas recirculation system, the device comprising:
 a first measuring transducer assigned to the throttle valve;
 a second measuring transducer assigned to the tank venting valve;
 a sensor for the mass flow via the exhaust gas recirculation system being assigned to the exhaust gas recirculation system;
 a mass flow normalizer assigned to the first measuring transducer, to the second measuring transducer, and to the sensor, wherein:
  the mass flow normalizer picks up, sums, and normalizes a first signal of the first measuring transducer, a second signal of the second measuring transducer, and a third signal of the sensor via the throttle valve, via the tank venting valve, and via the exhaust gas recirculation system;
 an allocator; and
 a convertor assigned to the mass flow normalizer and for calculating a virtual throttle valve angle from which the allocator determines the mass flow via the tank venting valve.

2. The device as recited in claim 1 wherein the mass flow normalizer normalizes the first signal, the second signal, and the third signal taking into account a temperature, a factor density, and a flow-through factor.

3. The device as recited in claim 2 wherein the allocator determines the mass flow via the tank venting valve from the virtual throttle valve angle, taking into account at least one of an engine speed, a temperature, a factor density, and a normalized supercritical mass flow via the tank venting valve.

4. The device as recited in claim 3 further comprising:
 an engine controller for controlling an engine parameter for the internal combustion engine and being situated downstream from the allocator.

5. The device as recited in claim 4 wherein:
the second measuring transducer is assigned to a pressure differential meter of the tank venting valve, and
an outflow characteristic curve of the tank venting valve is assigned to the second measuring transducer.

6. The device as recited in claim 5 wherein:
at least one of the first measuring transducer, the second measuring transducer, the sensor, the mass flow normalizer, the convertor, and the allocator one of is an integral component of the engine controller and is in at least one additional subsystem.

7. A method for determining mass flow via a tank venting valve for an internal combustion engine including an intake manifold and a throttle valve situated therein, comprising:
summing and normalizing mass flows via the throttle valve, via the tank venting valve, and via an exhaust gas recirculation system by including normalization factors, in a mass flow normalizer for forming a normalized mass flow;
determining a virtual throttle valve angle from the normalized mass flow; and
determining the mass flow via the tank venting valve from the virtual throttle valve angle.

8. The method as recited in claim 7 wherein the normalized mass flow is normalized, including at least one flow-through factor, a temperature factor, and a factor density.

9. The method as recited in claim 7 wherein an assignment between the normalized mass flow and the throttle valve angle is predefined via a characteristic curve, and the virtual throttle valve angle is calculated from the value of the normalized mass flow.

10. The method as recited in claim 7 wherein the mass flow via the tank venting valve is determined at least one of from the virtual throttle valve angle, including an engine speed, and taking into account at least one of a normalized supercritical mass flow via the tank venting valve, a factor density, and a temperature factor.

11. The method as recited in claim 7 wherein the virtual throttle valve angle corresponds to a throttle valve angle which would be necessary to supply a sum of the mass flows flowing into the intake manifold via the throttle valve alone.

* * * * *